(12) United States Patent
Goldman et al.

(10) Patent No.: US 10,372,419 B2
(45) Date of Patent: Aug. 6, 2019

(54) TRUSTED RANDOM NUMBER GENERATION BY A CLOUD SERVER

(71) Applicant: International Business Machines Corporation, Armonk, NY (US)

(72) Inventors: Kenneth A. Goldman, Norwalk, CT (US); Ashish Kundu, Elmsford, NY (US); Dimitrios Pendarakis, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 15/489,815

(22) Filed: Apr. 18, 2017

(65) Prior Publication Data

US 2018/0300108 A1  Oct. 18, 2018

(51) Int. Cl.
*G06F 7/58* (2006.01)
*H04L 29/08* (2006.01)
*H04L 29/06* (2006.01)

(52) U.S. Cl.
CPC ............... *G06F 7/588* (2013.01); *G06F 7/58* (2013.01); *H04L 67/10* (2013.01); *H04L 67/42* (2013.01)

(58) Field of Classification Search
CPC ..... H04L 67/42; H04L 67/10; H04L 67/1023; H04L 9/0869; H04L 9/0662; H04L 63/20; G06F 7/588
See application file for complete search history.

(56) References Cited

U.S. PATENT DOCUMENTS

| 9,077,524 | B2 | 7/2015 | Adams et al. |
| 9,329,836 | B2* | 5/2016 | Boenisch ................ G06F 7/588 |
| 2004/0221163 | A1* | 11/2004 | Jorgensen ........... H04L 63/0428 |
| | | | 713/182 |
| 2006/0235917 | A1* | 10/2006 | Manber .................. G06F 7/588 |
| | | | 708/250 |
| 2014/0136583 | A1 | 5/2014 | Hyde et al. |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Alina A Boutah
(74) *Attorney, Agent, or Firm* — Law Office of Jim Boice (57) ABSTRACT

A computer-implemented method generates a random number in a cloud-based random number server. The cloud-based random number server identifies multiple entropy sources. The cloud-based random number server identifies multiple disjointed entropy sources from the multiple entropy sources, which are logically and functionally independent of one another. The cloud-based random number server randomly selects multiple disparate entropy sources from the multiple disjointed entropy sources, and then receives multiple entropic values from the multiple disparate entropy sources, where each of the multiple disparate entropy sources supplies an entropic value that describes a type of entropic event not found in other entropy sources from the multiple disparate entropy sources. The cloud-based random number server mixes the multiple entropic values to create a combined entropic value, which is input into a random number generator to generate a random number for use by a client computer.

19 Claims, 7 Drawing Sheets

(56) References Cited

U.S. PATENT DOCUMENTS

| | | | |
|---|---|---|---|
| 2014/0244785 A1* | 8/2014 | Potlapally | H04L 67/10 709/217 |
| 2014/0245425 A1* | 8/2014 | Potlapally | H04L 63/164 726/14 |
| 2014/0298091 A1* | 10/2014 | Carlen | H04L 65/80 714/15 |
| 2015/0006601 A1* | 1/2015 | Aissi | G06F 21/60 708/250 |
| 2015/0058841 A1* | 2/2015 | Krempa | G06F 9/45558 718/1 |
| 2015/0106952 A1* | 4/2015 | Bacher | G06F 21/60 726/26 |
| 2015/0277856 A1* | 10/2015 | Payne | G06F 7/588 708/255 |
| 2015/0301803 A1* | 10/2015 | Boenisch | G06F 7/588 380/46 |
| 2016/0124716 A1* | 5/2016 | Venkata | G06F 7/588 708/250 |
| 2016/0180063 A1* | 6/2016 | Bhandaru | G06F 21/105 726/26 |
| 2016/0328211 A1* | 11/2016 | Nordholt | H04L 9/0852 |
| 2017/0085654 A1* | 3/2017 | Mikhailov | G06F 7/76 |
| 2017/0104675 A1* | 4/2017 | Acharya | H04L 43/08 |
| 2017/0244687 A1* | 8/2017 | Moulds | H04L 63/061 |
| 2018/0018458 A1* | 1/2018 | Schmugar | G06F 21/566 |
| 2018/0108024 A1* | 4/2018 | Greco | G06F 21/44 |

OTHER PUBLICATIONS

Ristenpart et al. "When Good Randomness Goes Bad: Virtual Machines Reset Vulnerabilities and Hedging Deployed Cryptography". NDSS Symposium 2010. Dept. of Computer Science and Engineering University of California, San Diego, USA, Feb. 9, 2013.

Berg et al. "PREDICT: Parallel Resources for Early Detection of Immediate Cuases of Tsunamis". Proceedings of the 2012 Seventh International Conference on P2P, Parallel, Grid, Cloud and Internet Computing, IEEE Computer Society, Washington, DC, 2012.

Brugger et al. "On Parallel Random Number Generation for Accelerating Simulations of Communication Systems". Copernicus Publications, Open Access Proceedings of Advances in Radio Science, 2014.

Kerrigan et al. "A Study of Entropy Sources in Cloud Computers: Radom Number Generation on Cloud Hosts". Springer-Verlag Berlin Heidelberg 2012, Kotenko and V. Skormin (Eds.): MMM-ACNS 2012, LNCS 7531, pp. 286-298, 2012.

Fernandes et al. "Randomness in Virtual Machines". Proceedings From the 2013 IEEE/ACM 6th International Conference on Utility and Cloud Computing, IEEE Computer Society, Washington, DC, pp. 282-286.

L'Ecuyer et al. "Implementing a Random Number Package With Splitting Facilities". ACM Transactions on Mathematical Software, vol. 17, No. 1, Mar. 1991, pp. 98-111.

Tan et al. "PLFG: A Highly Scalable Parallel Pseudo-Random Number Generator for Monte Carlo Simulations". Springer-Verlag Berlin Heidelberg 2000, HPCN 2000, LNCS 1823, pp. 127-135, 2000.

Everspaugh et al. "Not-So-Random Number in Virtualized Linux and the Whirlwind RNG". Proceedings of the 2014 IEEE Symposium on Security and Privacy, IEEE Computer Society, Washington, DC, pp. 559-574.

Robert Connolly, "Entropy and Random Number Generators in Linux". linuxfromscratch.org, May 16, 2007. <http://linuxfromscratch.org/HINTS/DOWNLOADS/FILES/ENTROPY.TXT>.

Anonymous, "Feeding/Dev/Random Enotrpy Pool?" Stack Exchange, Inc. 2016. Web. Oct. 26, 2016. <http://secruitystackexchange.com/QUESTIONS/89/FEEDING-DEV-RANDOM-ENTROPY-POOL>.

wikipedia.com, "Entropic Security". Wikimedia Foundation, Inc., Jun. 25, 2011. Web. Mar. 14, 2017. <https://en.wikipedia.org/wiki/Entropic_security>.

wikipedia.com, "Entropy (Information Theory)". Wikimedia Foundation, Inc., Mar. 7, 2017. Web. Mar. 14, 2017. <https://en.wikipedia.org/wiki/Entropy_(information_theory)>.

Alt et al., "Entropy Poisoning From the Hypervisor". mit.edu, 2015.

Vassilev et al., "Entropy-As-A-Service: Unlocking the Full Potential of Cryptography". Computer (Long Beach Calif). Sep. 2016; 49(9): 98-102.

* cited by examiner

TRUSTED RANDOM NUMBER GENERATION BY A CLOUD SERVER

BACKGROUND

The present invention relates to the field of computers, and particularly to computers that are capable of generating random numbers. Still more particularly, the present invention relates to a cloud server generating a trusted random number.

SUMMARY

In one or more embodiments of the present invention, a computer-implemented method generates a random number in a cloud-based random number server. The cloud-based random number server identifies multiple entropy sources, where each of the multiple entropy sources is capable of providing entropic signals that are derived from an exclusive random event. The cloud-based random number server then identifies multiple disjointed entropy sources from the multiple entropy sources, where the multiple disjointed entropy sources are logically and functionally independent of one another. The cloud-based random number server randomly selects multiple disparate entropy sources from the multiple disjointed entropy sources, and then receives multiple entropic values from the multiple disparate entropy sources, where each of the multiple disparate entropy sources supplies an entropic value that describes a type of entropic event not found in other entropy sources from the multiple disparate entropy sources. The cloud-based random number server mixes the multiple entropic values to create a combined entropic value, which is input into a random number generator on the cloud-based random number server to generate a random number. The random number is transmitted from the cloud-based random number server to a client computer, which uses the random number as an input to a client operation performed by the client computer.

The described invention may also be implemented in a computer system and/or as a computer program product.

DETAILED DESCRIPTION

Figure 1:
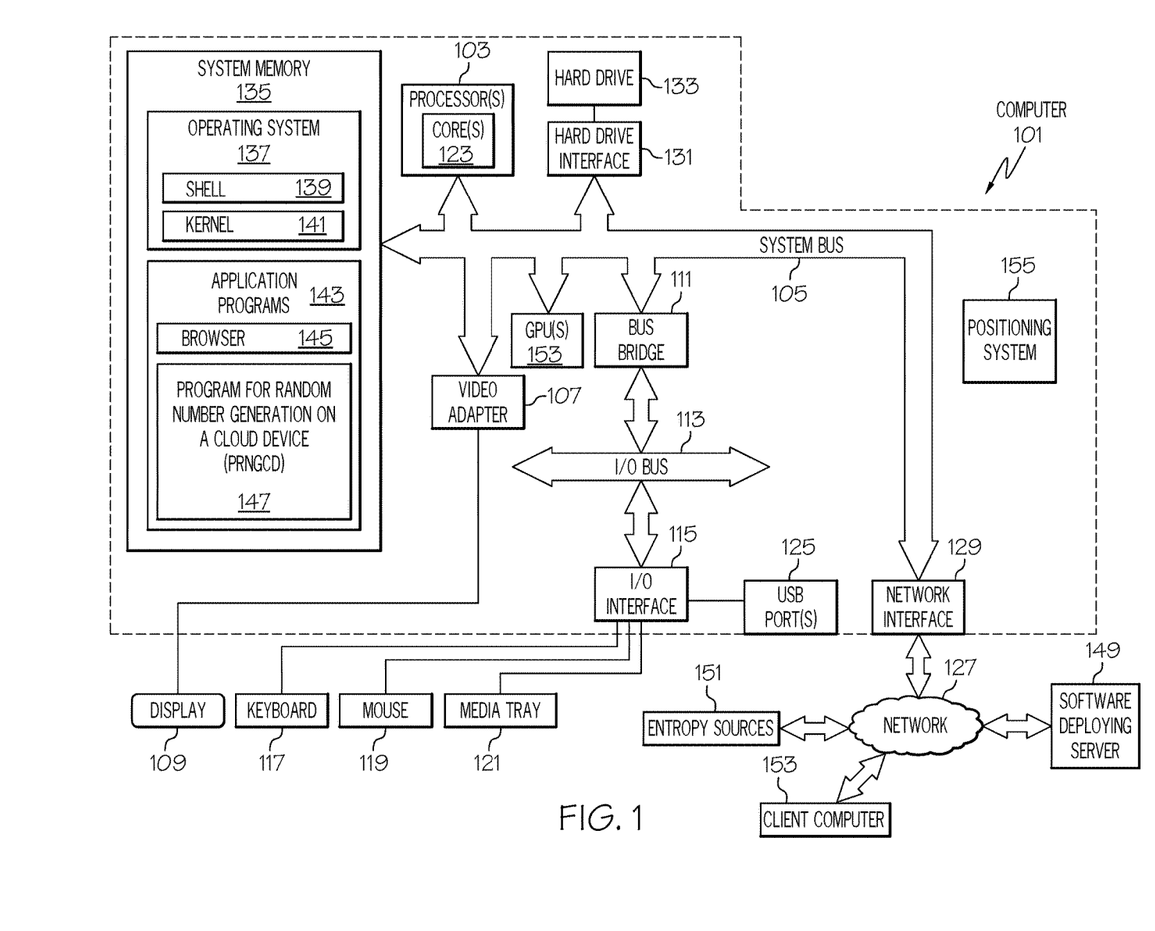
FIG. 1 depicts an exemplary system and network in which the present disclosure may be implemented.

With reference now to the figures, and in particular to FIG. 1, there is depicted a block diagram of an exemplary system and network in accordance with one or more embodiments of the present invention. Some or all of the exemplary architecture, including both depicted hardware and software, shown for and within computer 101 is utilized by software deploying server 149 and/or entropy sources 151 and/or client computer 153 shown in FIG. 1; and/or cloud-based random number server 201, entropy sources 251, and/or client computer 253 shown in FIG. 2; and/or cloud-based random number server 301 and/or entropy sources 351 shown in FIG. 3; and/or cloud-based random number server 401 and/or mobile device and apps 451a and/or cloud providers 451b and/or client-provider sources 451c shown in FIG. 4.

Referring now to FIG. 1, exemplary computer 101 includes a processor 103 that is operably coupled to a system bus 105. Processor 103 may utilize one or more processors, each of which has one or more processor core(s) 123. A video adapter 107, which drives/supports a display 109 (which may be a touch screen capable of receiving touch inputs), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one or more embodiments, some or all of these ports are universal serial bus (USB) ports.

As depicted, network interface 129 is also coupled to system bus 105. Network interface 129 can be a hardware network interface, such as a network interface card (NIC), etc. Computer 101 is able to communicate with a software deploying server 149 and/or worker machines 151 via network interface 129 and network 127. Network 127 may include (without limitation) one or more external networks—such as a wide area network (WAN), and/or a network of networks such as the Internet—and/or one or more internal networks such as an Ethernet or a virtual private network (VPN). In one or more embodiments, network 127 includes a wireless network, such as a Wi-Fi network, and a cellular network. An example embodiment in a network "cloud" environment will be discussed with reference to FIGS. 6 and 7.

Referring again to FIG. 1, a hard drive interface 131 is also coupled to system bus 105. Hard drive interface 131 interfaces with a hard drive 133. In one embodiment, hard drive 133 is a non-volatile memory storing and populates a system memory 135 (e.g., random access memory (RAM)), which is also coupled to system bus 105. System memory may be considered a lowest level of volatile memory in computer 101. System memory 135 may include additional, higher levels of volatile memory (not shown), including, but not limited to, cache memory, registers and buffers. Data that populates system memory 135 includes computer 101's operating system (OS) 137 and application programs 143.

Operating system (OS) 137 includes a shell 139, for providing transparent user access to resources such as application programs 143. Generally, shell 139 is a program that provides an interpreter and an interface between the user and the OS. More specifically, shell 139 (sometimes referred to as a command processor) can execute commands entered into a command-line user interface or from a file. In other words, shell 139 can serve as a command interpreter. While shell 139 is a text-based, line-oriented user interface, the present invention will equally well support other user interface modes, such as graphical, voice, gestural, etc. As depicted, shell 139 can be considered the highest level of an OS software hierarchy. The shell can also provide a system prompt, interpret commands entered by keyboard, mouse, or other user input media, and send the interpreted command(s) to the appropriate (e.g., lower) levels of the operating system (e.g., a kernel 141) for processing.

As depicted, OS 137 also includes kernel 141, which includes (hierarchically) lower levels of functionality for OS 137. A few (non-limiting) examples of kernel functions include: providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions (not depicted) enabling a world wide web (WWW) client (i.e., computer 101) to send and receive network messages from network 127 (e.g., the Internet using hypertext transfer protocol (HTTP) messaging), thus enabling communication with software deploying server 149 and other systems.

In some embodiments, application programs 143 in computer 101's system memory include Program for Random Number Generation on a Cloud Device (PRNGCD) 147. In some embodiments, system memory 135 can be shared and/or application programs 143 distributed across one or more software deploying servers 149 or other systems. As depicted, PRNGCD 147 includes program instructions (software) adapted for implementing processes and/or functions in accordance with the present invention, such as those described with reference to FIGS. 2-5. In some embodiments, PRNGCD 147 is downloaded from software deploying server 149, (on-demand or "just-in-time", wherein the software in PRNGCD 147 is not downloaded until needed for execution). In one embodiment of the present invention, software deploying server 149 performs all of the functions associated with the present invention (including execution of PRNGCD 147), thus freeing computer 101 from having to use its own internal computing resources to execute PRNGCD 147.

The hardware elements depicted in computer 101 are not intended to be exhaustive, but rather are representative to highlight essential components required by the present invention. For instance, computer 101 may include alternate memory storage devices such as flash memory, magnetic cassettes, digital versatile disks (DVDs), Bernoulli cartridges, and the like. These and other variations are intended to be within the spirit and scope of the present invention.

Random numbers are used in a variety of computer operations. For example, when generating a set of public/private security keys (which are used to encrypt and decrypt data), a random number is used to create each of the public/private security keys. Random numbers are also used as test data, which is used to test computer systems, including their hardware and software.

As the name implies, "random numbers" must be "random" in order to be useful. That is, if a set of "random numbers" follows a pattern (e.g., a set of sequential even numbers), then they are no longer random.

The "randomness" of random numbers may not only be non-random (e.g., a recognized sequence such as a sequence of even numbers), but they may be from recognized sources such that they can be easily replicated (and thus non-random). For example, assume that a "random number" is generated by performing a Fourier analysis of a known radio signal (e.g., a navigation beacon). By knowing that the random number was derived by performing a Fourier analysis of this known radio signal, then the random number can be replicated such that it is no longer "random" (i.e., is not a known number). This radio signal is a form of "entropy".

As used herein, the term "entropy" is defined as a random set of events, which are described by "entropic signals" or "entropic values". For example, assume that a transmission line's signal-to-noise ratio (i.e., the ratio of voltage on the transmission line that is generated by an intentional signal to stray voltage (noise) on the transmission line) jumps from 3:1 to 5:1 to 2:1 to 0.5:1 in no particular order (i.e., is random). This change in the signal-to-noise ratio on the transmission line is referred to as "entropy", and the different signal-to-noise ratios are known as "entropic signals" or "entropic values".

A random number generator (RNG) can then take these entropic signals/values as inputs, in order to generate a random number. In a very simplistic RNG, an average of the first value of the signal-to-noise ratios is taken to generate the random number of 2.625 (i.e., (3+5+2+0.5)/4=2.625).

The problem of generating a truly random number by an RNG is particularly prevalent if the random number is generated by a cloud resource using an entropic signal created by that cloud resource. For example, if that cloud-based server uses commands such as /dev/random (which generates random numbers from a random number generator (RNG) only as long as there is enough entropy available to the system) and/or /dev/urandom (a "non-blocking" command that will cause the RNG to generate random numbers regardless of the amount of available entropy), the entropy often comes from virtual machines (VMs) that make up the cloud-based server. These VMs have no physical transmission lines, keyboards, processors, etc. that could generate entropic events (e.g., noise). Therefore, the entropy must be based on pseudorandom software-generated signals created by the VMs. If the software used to generate these pseudo-random signals is known, then the entropy can be easily replicated, thus making replication of the pseudorandom signals possible, if not easy. This replication of the pseudo-random signals allows "random" numbers to be replicated.

Thus, the present invention does not use the cloud resource to generate its own entropy. Rather, disparate types of entropy generating resources are called upon in a random manner, such that their entropic signals can be combined into a combined entropic signal, which cannot be predicted (since the disparate types of entropy generating resources are not logically or functionally related).

Figure 2:
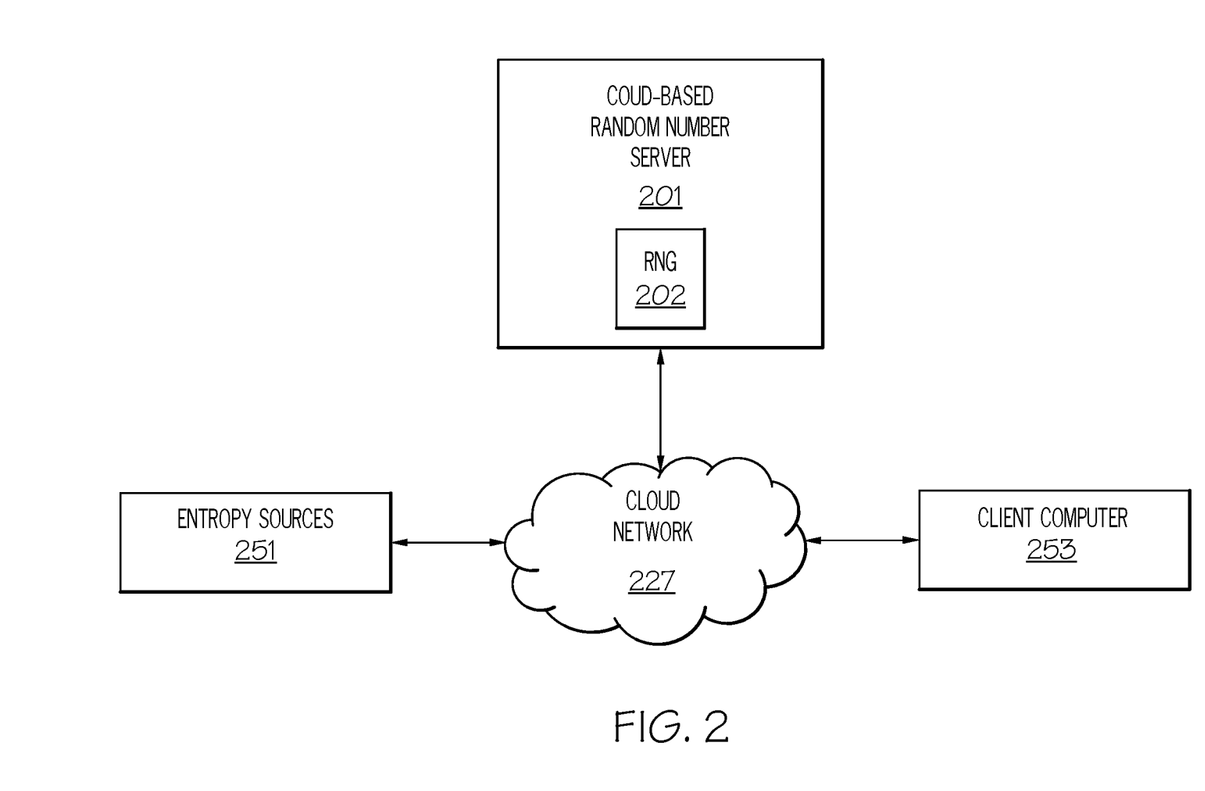
FIG. 2 illustrates an exemplary relationship between a cloud-based random number server, entropy sources, and a client computer connected by a cloud network in accordance with one or more embodiments of the present invention.

With reference now to FIG. 2, an exemplary relationship is depicted between a cloud-based random number server 201 (analogous to computer 101 shown in FIG. 1), entropy sources 251 (analogous to entropy sources 151 shown in FIG. 1), and a client computer 253 (analogous to client computer 153 shown in FIG. 1) which are connected by a cloud network 227 (analogous to network 127 shown in FIG. 1). At a high level overview of the present invention, the cloud-based random number server 201 receives entropic signals from the disparate entropy sources 251; generates a random number by inputting these entropic signals (or a form thereof) into a random number generator (RNG) 202, and returns the random number to the client computer 253. In one embodiment of the present invention, RNG 202 is a hardware chip (e.g., an application specific integrated circuit—ASIC) that is devoted to generating random numbers based on entropic signal inputs.

Figure 3:
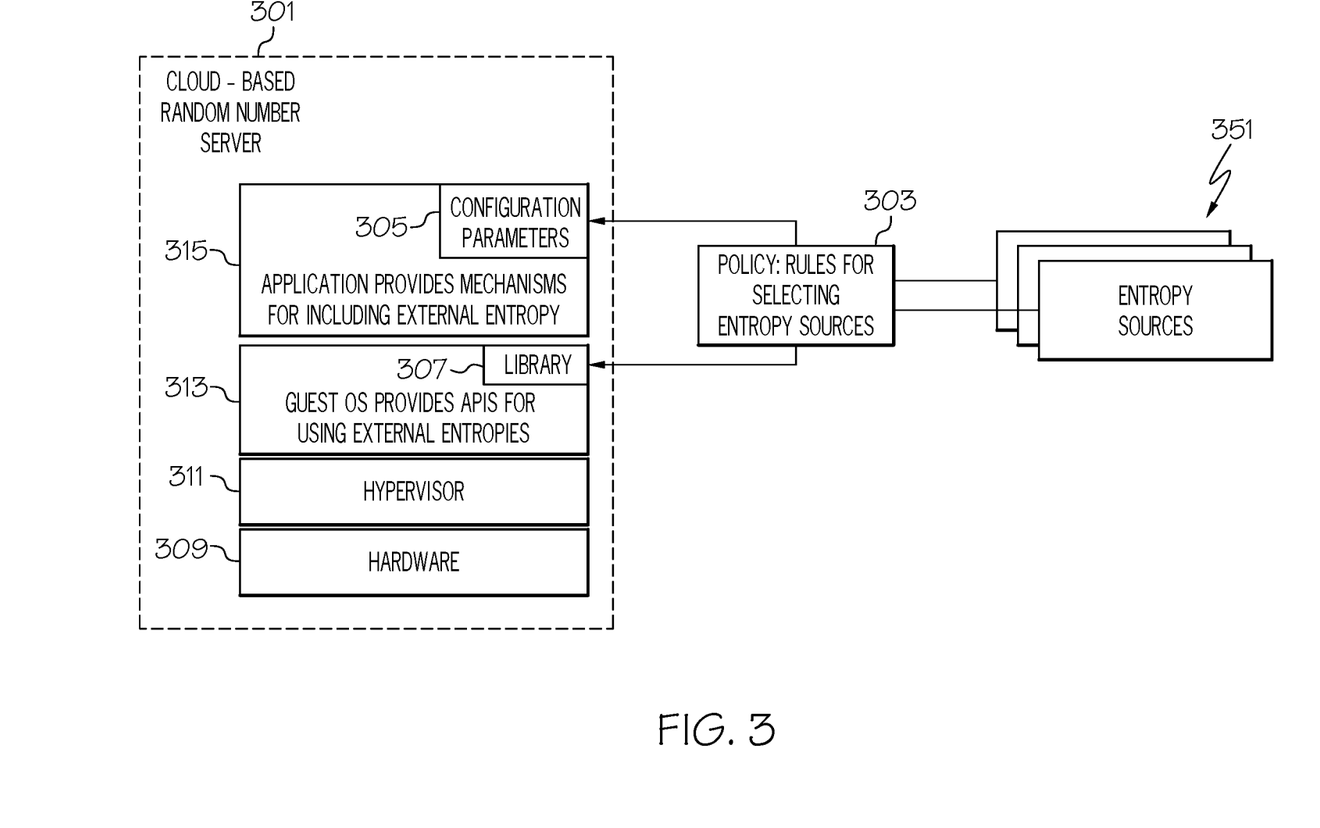
FIG. 3 depicts a policy, configuration parameters, and a library used by the cloud-based random number server to generate a random number from entropic signals received from the entropy sources shown in FIG. 2 in accordance with one or more embodiments of the present invention.

With reference now to FIG. 3, additional details of some of the elements shown in FIG. 3 are presented.

As shown in FIG. 3, a cloud-based random number server 301 (analogous to the cloud-based random number server 201 shown in FIG. 2) runs on hardware 309 (e.g., processors, memory, input/output interfaces, etc.), which may be physical or virtual (in the case of a VM). A hypervisor 311 controls operations of the hardware 309 as well as the operating system (e.g., the guest operating system 313 that provides application programming interfaces that allow the cloud-based random number server 301 to access external entropies such as entropy sources 351, which are analogous to entropy sources 251 shown in FIG. 2) as well as application 315, which provides mechanism for including/using external entropy when generating random numbers (e.g., by a RNG).

As shown, the application 315 has configuration parameters 305 associated with it. These configuration parameters 305 describe what types of random numbers are generated (e.g., how secure the numbers are, what format they are in, etc.).

Furthermore, the guest operating system (OS) 313 is associated with a library 307, which contains a listing of all available entropy sources from the entropy sources 351. That is, the library 307 describes which of the entropy sources 351 are authorized to be used by the cloud-based random number server 301.

Figure 4:
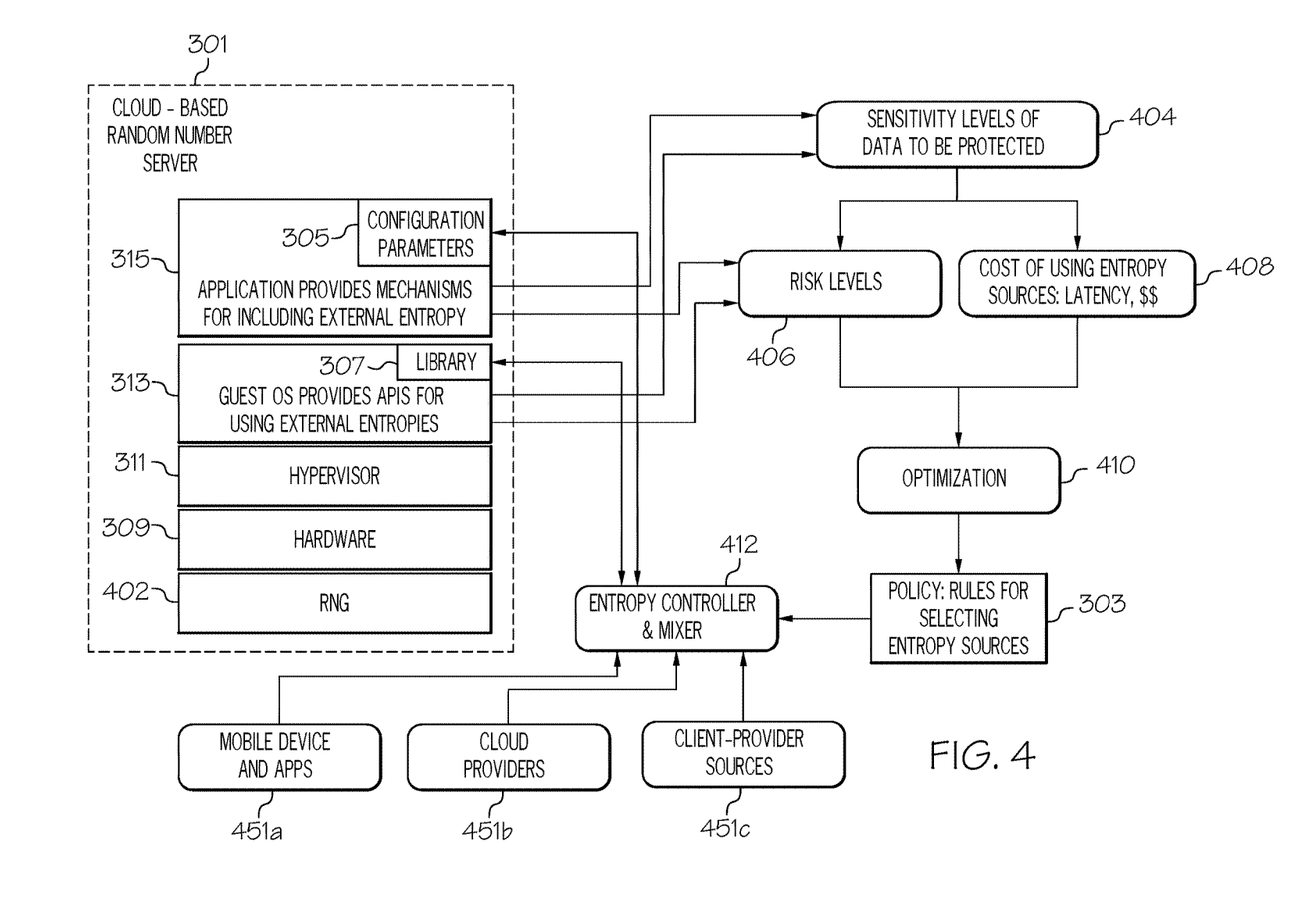
FIG. 4 illustrates a process for utilizing and generating the policy depicted in FIG. 3 in accordance with one or more embodiments of the present invention.

The configuration parameters 305 and library 307 are determined by policy 303, which includes rules for selecting entropy sources from entropy sources 351. FIG. 4 illustrates a process for generating and utilizing the policy 303 depicted in FIG. 3 in accordance with one or more embodiments of the present invention.

As shown in FIG. 4, the application 305 and guest OS 307 determine sensitivity levels of data to be protected by a random number that is generated by the RNG 402 (analogous to RNG 202 shown in FIG. 2) that is within (or otherwise associated with) the cloud-based random number server 301. For example, if a random number is used to test a device, the randomness (and secrecy) of the random number is much less important than if the random number is used to encrypt highly sensitive data before transmitting it from one device to another device. Thus, not only are risk levels (see block 406) considered, but also costs of using certain entropy sources (see block 408). That is, some entropy sources may have a long latency period as they "wait" for some event to occur (e.g., a solar flare that generates a particular electromagnetic signal). Furthermore, some entropy sources may be expensive (e.g., a highly secure sensor that is expensive to use and maintain).

As shown in block 410, an optimization of the best entropy sources to be used for a particular use is established, leading to the generation of the policy 303. For example, the policy may include a rule such as "When encrypting data that is rated Top Secret or higher, use an entropy source that can return an entropic signal within one second and that costs less than $1.00 USD to access".

The policy 303 is fed into an entropy controller and mixer (see block 412), which selects (according to the policy 303) multiple entropy sources that comport with policy 303. These multiple entropy sources are depicted as mobile device and apps 451a, cloud providers 451b, and client-provider sources 451c. In a preferred embodiment, the entropy controller and mixer combines the entropic signals received from mobile device and apps 451a, cloud providers 451b, and client-provider sources 451c into a combined entropic value, which is used as an input to the RNG 402 to generate the random number.

Mobile device and apps 451a is a mobile device that is able to telecommunicate (e.g., a smart phone). As such, mobile device and apps 451a is able to detect and/or generate a certain type of entropic event. For example, mobile device and apps 451a can detect random variations in radio signals sent from and/or received by mobile device and apps 451a. Furthermore, mobile device and apps 451a can detect random noise/voltages that occur when a user inputs data onto a touch screen, turns up the volume, etc. These are examples of hardware induced entropic events. Furthermore, applications (apps) running on the mobile device and apps 451a can generate their own random events, such as retrieving a particular webpage, receiving a phone call from a particular phone number, etc. These random events (referred to herein as "entropic events" due to their unpredictable and random nature) generate entropic signals, which are derived from the entropic events. For example, whenever a phone call comes in from phone number 123-456-7899, this number itself (1234567899) may be the entropic signal. In a preferred embodiment, however, the number 1234567899 is input into an algorithm that produces another (e.g., hashed) number, such as 89.45.

In one or more embodiments of the present invention, cloud providers 451b are virtual devices, such as virtual machines (VMs), which are software emulations of physical computers. As such, the VMs have no hardware components, but rather are only software emulations. Therefore, a different type of entropic events occur in the VMs compared to those that occur on the mobile devices and apps 451a. That is, no hardware-generated entropic events occur; rather, only software-generated entropic events occur. For example, a software emulation may emulate a clock speed or simulated signal on a simulated transmission line etc. As such, all entropic events are emulated, just as the hardware in the VMs are emulated.

The client-provider sources 451c are from the client computer 253 shown in FIG. 2. As such, the client computer 253 can generate both hardware-based entropic events (e.g., noise caused by pressing a key on a keyboard, system bus noise/voltage spikes, etc.) as well as software events (e.g., a page swap caused by a cache overflow, etc.).

As shown in FIG. 4, once the entropy controller and mixer described in block 412 selects the entropy sources (e.g., elements 451a-451c) in accordance with the policy 303, a description of which entropy sources were selected is returned to the configuration parameters 305 and library 307 for future use by the cloud-based random number server 301.

Figure 5:
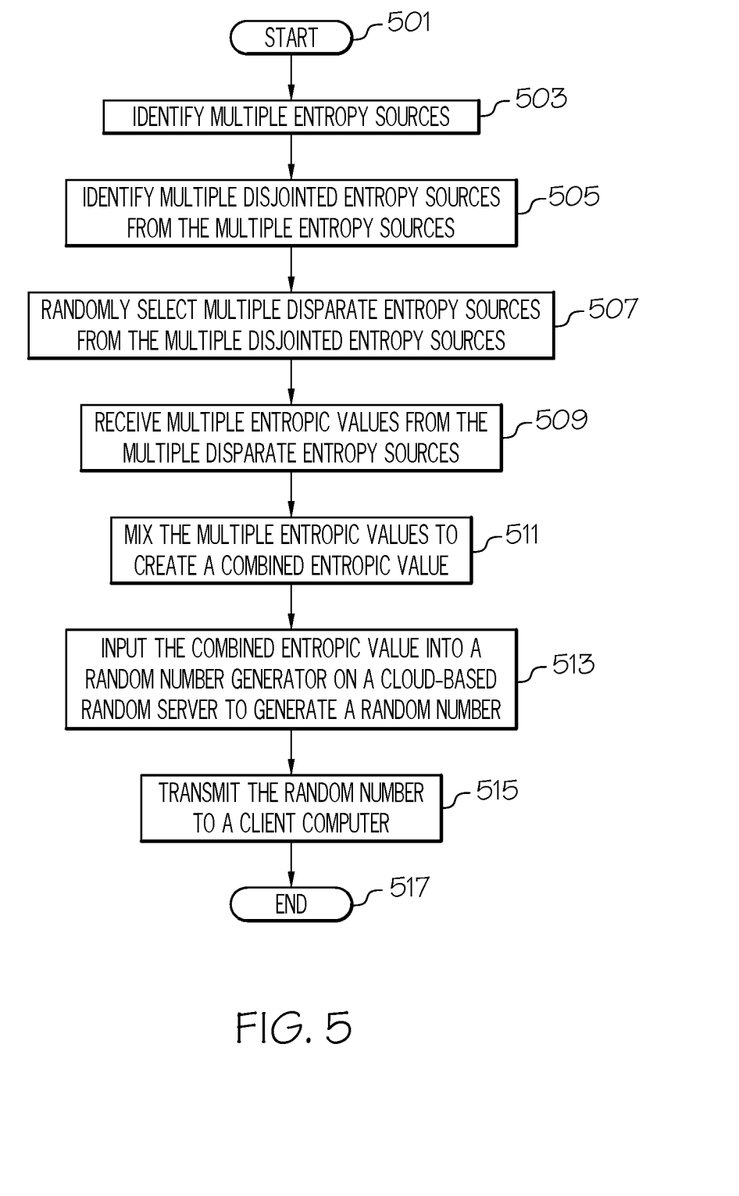
FIG. 5 is a high level flow chart of steps performed by one or more processors and/or other hardware devices in accordance with one or more embodiments of the present invention.

With reference now to FIG. 5, a high level flow chart of steps performed by one or more processors and/or other hardware devices in accordance with one or more embodiments of the present invention is presented.

After initiator block 501, a cloud-based random number server (e.g., cloud-based random number server 301 shown in FIG. 3), identifies multiple entropy sources (e.g., entropy sources 351), as described in block 503. Each of the multiple entropy sources is capable of providing entropic signals that are derived from an exclusive random event. That is, some random (entropy/entropic) event occurs within each of the entropy sources, which results in a unique entropic signal.

As described in block 505, the cloud-based random number server then identifies multiple disjointed entropy sources from the multiple entropy sources, where the multiple disjointed entropy sources are logically and functionally independent of one another. For example, the mobile device and apps 451a shown in FIG. 4 is not in communication with nor is it dependent upon nor is it logically associated with nor does it have a common owner with the cloud providers 451b or the client-provider sources 451c. Likewise, the cloud providers 451b are not in communication with nor are they dependent upon nor are they logically associated with nor do they have a common owner with the client-provider sources 451c. Thus, there is no way to associate the mobile device and apps 451a and the cloud providers 451b and the client-provider sources 451c to one another, either physical, logically, possessively, etc.

As described in block 507, the cloud-based random number server then randomly selects multiple disparate entropy sources from the multiple disjointed entropy sources. In a preferred embodiment of the present invention, the multiple disjointed entropy sources outnumber the multiple disparate entropy sources (that is, the multiple disparate entropy sources are some, but not all, of the multiple disjointed entropy sources).

As described in block 509, the cloud-based random number server receives multiple entropic values (i.e., signals that describe the different entropic events) from the multiple disparate entropy sources, such that each of the multiple disparate entropy sources supplies an entropic value that describes a type of entropic event not found in other entropy sources from the multiple disparate entropy sources. For example, only mobile device and apps 451a can provide entropic events that are caused by cellular phone radio signals, while only cloud providers 451b can provide entropic events that are based on the virtual configuration, and only client-provider sources 451c can provide entropic events that are unique to client computers (e.g., certain keyboard functions, system bus noise, etc.).

As described in block 511, the cloud-based random number server then mixes the multiple entropic values to create a combined entropic value (see block 412 in FIG. 4).

As described in block 513, the cloud-based random number server inputs the combined entropic value into a random number generator (e.g., RNG 402 shown in FIG. 4) on the cloud-based random number server to generate a random number.

As described in block 515, the cloud-based random number server transmits the random number to a client computer (e.g., client computer 253 shown in FIG. 2), which uses the random number as an input to a client operation performed by the client computer. For example, the client computer may use the random number to generate a hash for locating data faster, encrypt data for making the client computer operate more securely, test logic within the client computer in order to modify and improve the architecture of the client computer, etc.

The flow chart ends at terminator block 517.

As described herein, in an embodiment of the present invention the multiple disparate entropy sources include multiple mobile telecommunication devices, multiple cloud-based devices, and the client computer (see FIG. 4). As such, one embodiment of the present invention randomly selects, by the cloud-based random number server, one of the multiple mobile telecommunication devices to provide a first type of entropic value to the cloud-based random number server, and then randomly selects, by the cloud-based random number server, one of the multiple cloud-based devices to provide a second type of entropic value to the cloud-based random number server. That is, there are multiple mobile device and apps 451a and multiple cloud providers 451b available to the cloud-based random number server 301 (and more specifically to the entropy controller and mixer shown in block 412 in FIG. 4). Thus, in order to provide even more randomness to the system, the cloud-based random number server 301 and/or the entropy controller and mixer shown in block 412 will randomly select one of the multiple mobile device and apps 451a and one of the multiple cloud providers 451b as entropy sources to be used in generating the random number by the RNG 402.

As described herein, in one embodiment of the present invention the first type of entropic value from the multiple mobile telecommunication devices is derived from telecommunication signals used by the multiple mobile telecommunication devices.

As described herein, in one embodiment of the present invention the second type of entropic value from the multiple cloud-based devices is derived from random signals generated by software in the multiple cloud-based devices.

As described herein, in one embodiment of the present invention an entropic value from the client computer is derived from noise generated by a hardware device (e.g., a keyboard, a system bus, a hard drive, etc.) on the client computer.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
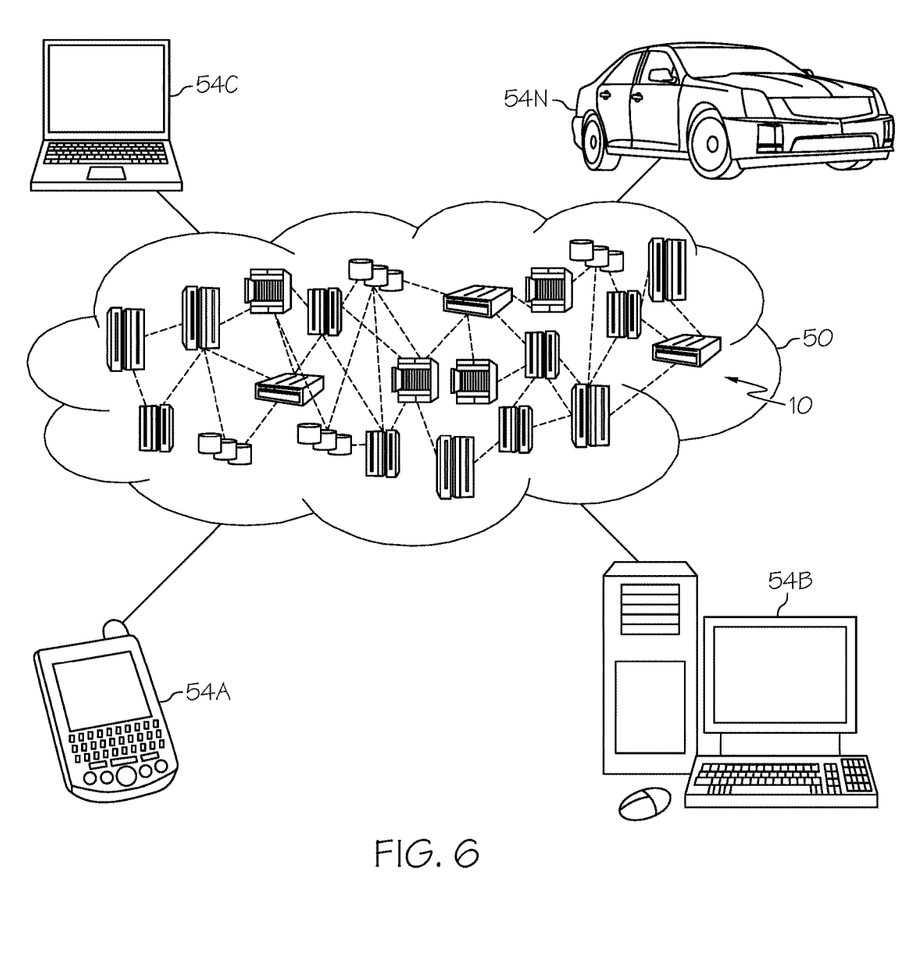
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
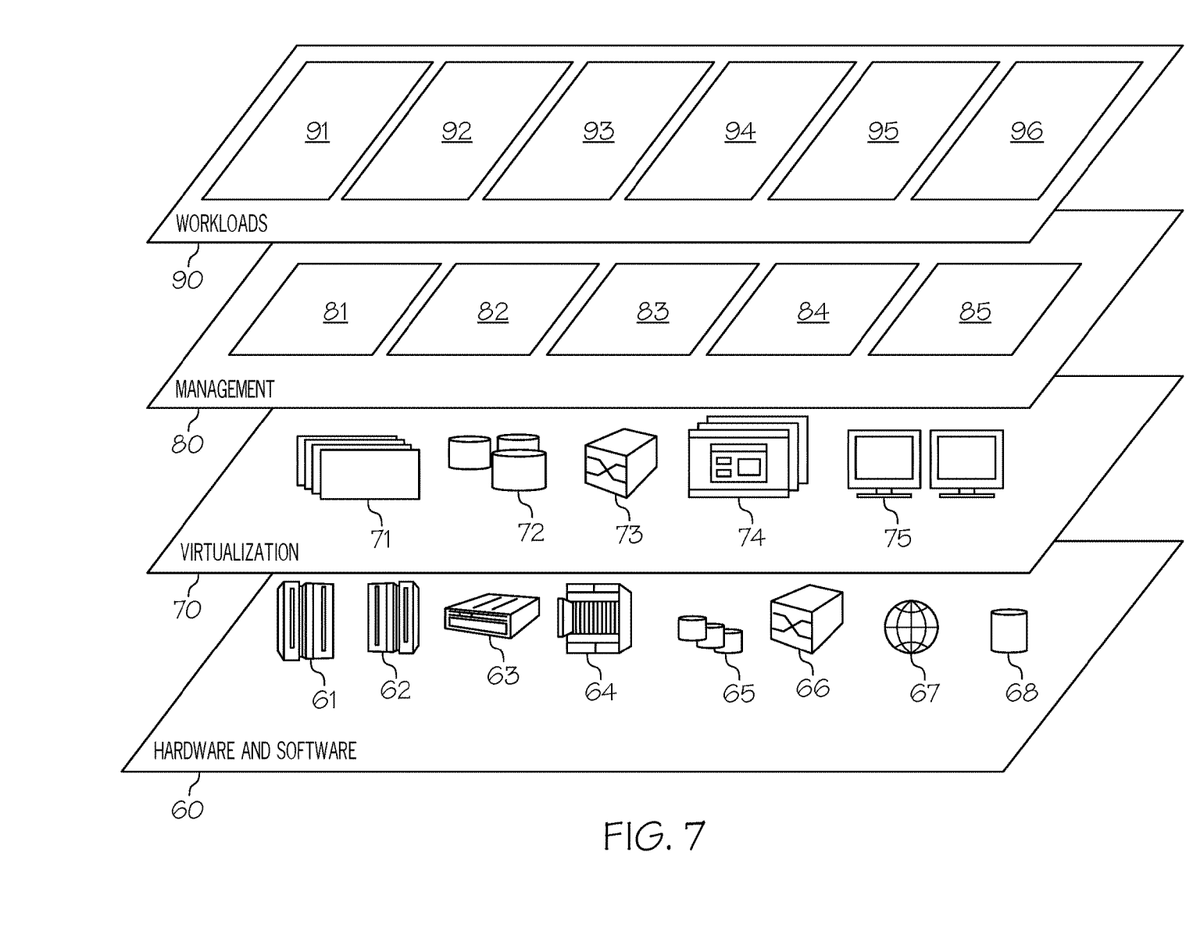
FIG. 7 depicts abstraction model layers of a cloud computing environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and random number generation processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
   identifying, by a cloud-based random number server, multiple entropy sources, wherein each of the multiple entropy sources is capable of providing entropic signals that are derived from an exclusive random event;
   identifying, by the cloud-based random number server, multiple disjointed entropy sources from the multiple entropy sources, wherein the multiple disjointed entropy sources are logically and functionally independent of one another;
   randomly selecting, by the cloud-based random number server, multiple disparate entropy sources from the multiple disjointed entropy sources;
   receiving, by the cloud-based random number server, multiple entropic values from the multiple disparate entropy sources, wherein each of the multiple disparate entropy sources supplies an entropic value that describes a type of entropic event not found in other entropy sources from the multiple disparate entropy sources;
   mixing, by the cloud-based random number server, the multiple entropic values to create a combined entropic value;
   inputting, by the cloud-based random number server, the combined entropic value into a random number generator on the cloud-based random number server to generate a random number;
   transmitting the random number from the cloud-based random number server to a client computer, wherein the client computer uses the random number as an input to a client operation performed by the client computer;
   determining which of the multiple disparate entropy sources are authorized entropy sources that are authorized to be used by the cloud-based random number server;
   storing the authorized entropy sources in a library; and
   selecting, by the cloud-based random number server, one or more of the authorized entropy sources from the library to supply the multiple entropic values.

2. The computer-implemented method of claim 1, wherein the multiple disparate entropy sources comprise multiple mobile telecommunication devices, multiple cloud-based devices, and the client computer, and wherein the computer-implemented method further comprises:
   randomly selecting, by the cloud-based random number server, one of the multiple mobile telecommunication devices to provide a first type of entropic value to the cloud-based random number server; and
   randomly selecting, by the cloud-based random number server, one of the multiple cloud-based devices to provide a second type of entropic value to the cloud-based random number server.

3. The computer implemented method of claim 2, wherein the first type of entropic value from the multiple mobile telecommunication devices is derived from telecommunication signals used by the multiple mobile telecommunication devices.

4. The computer implemented method of claim 2, wherein the second type of entropic value from the multiple cloud-based devices is derived from random signals generated by software in the multiple cloud-based devices.

5. The computer implemented method of claim 2, wherein an entropic value from the client computer is derived from noise generated by a hardware device on the client computer.

6. The computer-implemented method of claim 1, wherein the multiple disjointed entropy sources outnumber the multiple disparate entropy sources.

7. A computer program product for generating a random number in a cloud-based random number server, the computer program product comprising a computer readable storage device having program instructions embodied therewith, the program instructions readable and executable by a computer to perform a method comprising:
   identifying, by a cloud-based random number server, multiple entropy sources, wherein each of the multiple entropy sources is capable of providing entropic signals that are derived from an exclusive random event;
   identifying, by the cloud-based random number server, multiple disjointed entropy sources from the multiple entropy sources, wherein the multiple disjointed entropy sources are logically and functionally independent of one another;
   randomly selecting, by the cloud-based random number server, multiple disparate entropy sources from the multiple disjointed entropy sources;
   receiving, by the cloud-based random number server, multiple entropic values from the multiple disparate entropy sources, wherein each of the multiple disparate entropy sources supplies an entropic value that describes a type of entropic event not found in other entropy sources from the multiple disparate entropy sources;
   mixing, by the cloud-based random number server, the multiple entropic values to create a combined entropic value;
   inputting, by the cloud-based random number server, the combined entropic value into a random number generator on the cloud-based random number server to generate a random number;
   transmitting the random number from the cloud-based random number server to a client computer, wherein the client computer uses the random number as an input to a client operation performed by the client computer;

determining which of the multiple disparate entropy sources are authorized entropy sources that are authorized to be used by the cloud-based random number server;

storing the authorized entropy sources in a library; and selecting, by the cloud-based random number server, one or more of the authorized entropy sources from the library to supply the multiple entropic values.

8. The computer program product of claim 7, wherein the multiple disparate entropy sources comprise multiple mobile telecommunication devices, multiple cloud-based devices, and the client computer, and wherein the method further comprises:

randomly selecting, by the cloud-based random number server, one of the multiple mobile telecommunication devices to provide a first type of entropic value to the cloud-based random number server; and randomly selecting, by the cloud-based random number server, one of the multiple cloud-based devices to provide a second type of entropic value to the cloud-based random number server.

9. The computer program product of claim 8, wherein the first type of entropic value from the multiple mobile telecommunication devices is derived from telecommunication signals used by the multiple mobile telecommunication devices.

10. The computer program product of claim 8, wherein the second type of entropic value from the multiple cloud-based devices are derived from random signals generated by software in the multiple cloud-based devices.

11. The computer program product of claim 8, wherein an entropic value from the client computer is derived from noise generated by a hardware device on the client computer.

12. The computer-implemented method of claim 1, wherein the multiple disjointed entropy sources each have a different owner.

13. The computer program product of claim 7, wherein the program instructions are provided as a service in a cloud environment.

14. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:

program instructions to identify multiple entropy sources, wherein each of the multiple entropy sources is capable of providing entropic signals that are derived from an exclusive random event;

program instructions to identify multiple disjointed entropy sources from the multiple entropy sources, wherein the multiple disjointed entropy sources are logically and functionally independent of one another;

program instructions to randomly select multiple disparate entropy sources from the multiple disjointed entropy sources;

program instructions to receive multiple entropic values from the multiple disparate entropy sources, wherein each of the multiple disparate entropy sources supplies an entropic value that describes a type of entropic event not found in other entropy sources from the multiple disparate entropy sources;

program instructions to mix the multiple entropic values to create a combined entropic value;

program instructions to input the combined entropic value into a random number generator on a cloud-based random number server to generate a random number;

program instructions to transmit, from the random number to a client computer, the random number, wherein the client computer uses the random number as an input to a client operation performed by the client computer;

program instructions to determine which of the multiple disparate entropy sources are authorized entropy sources that are authorized to be used by the cloud-based random number server;

program instructions to store the authorized entropy sources in a library; and program instructions to select one or more of the authorized entropy sources from the library to supply the multiple entropic values.

15. The computer system of claim 14, wherein the multiple disparate entropy sources comprise multiple mobile telecommunication devices, multiple cloud-based devices, and the client computer, and wherein the computer system further comprises:

program instructions to randomly select one of the multiple mobile telecommunication devices to provide a first type of entropic value to the cloud-based random number server; and program instructions to randomly select one of the multiple cloud-based devices to provide a second type of entropic value to the cloud-based random number server.

16. The computer-implemented method of claim 1, wherein the multiple disjointed entropy sources are not in communication with one another.

17. The computer-implemented method of claim 1, wherein the at least one of the multiple entropy sources is a telephone that receives a random telephone call from a telephone number, and wherein numerals in the telephone number are the entropic signals.

18. The computer system of claim 15, wherein an entropic value from the client computer is derived from noise generated by a hardware device on the client computer.

19. The computer system of claim 14, wherein the stored program instructions are provided as a service in a cloud environment.

* * * * *